(12) United States Patent
Fucikova et al.

(10) Patent No.: US 10,287,494 B2
(45) Date of Patent: May 14, 2019

(54) SYNTHESIZED THIN SHELL PASSIVATED SILICON NANOCRYSTALS WITH A NARROW PHOTOLUMINESCENCE LINEWIDTH

(71) Applicants: Anna Fucikova, Konesin (CZ); Jan Linnros, Stockholm (CZ); Ilya Sychugov, Stockholm (SE)

(72) Inventors: Anna Fucikova, Konesin (CZ); Jan Linnros, Stockholm (CZ); Ilya Sychugov, Stockholm (SE)

( * ) Notice: Subject to any disclaimer, the term of this patent is extended or adjusted under 35 U.S.C. 154(b) by 183 days.

(21) Appl. No.: 15/252,265

(22) Filed: Aug. 31, 2016

(65) Prior Publication Data

US 2018/0057736 A1    Mar. 1, 2018

(51) Int. Cl.
    *C09K 11/02*      (2006.01)
    *C09K 11/59*      (2006.01)

(52) U.S. Cl.
    CPC ............ *C09K 11/59* (2013.01); *C09K 11/025* (2013.01)

(58) Field of Classification Search
CPC ..... C09K 11/59; C09K 11/025; C01B 33/021; B82Y 20/00; B82Y 40/00
See application file for complete search history.

(56) References Cited

U.S. PATENT DOCUMENTS 3,615,272 A    10/1971   Collins et al.

FOREIGN PATENT DOCUMENTS

WO    WO 2006/125313    * 11/2006

* cited by examiner

*Primary Examiner* — C Melissa Koslow

(57) ABSTRACT

Silicon nanocrystals with surface passivation shell are exhibiting unexpected and quite exceptional optical properties (for example ultra narrow linewidth). They are synthesized from hydrogen silsesquioxane-like molecules, which are modified by organic molecules, and subsequently annealed at high temperatures in an inert atmosphere. Silicon nanocrystals are formed from hydrogen silsesquioxane during annealing and the added organic molecules for a surface passivation shell by bonding to the surface Si atoms of the nanocrystals. The invention is particularly useful for preparation of light emitting fluorophores with a narrow emission band, given that inhomogeneous broadening can be reduced.

15 Claims, 1 Drawing Sheet

SYNTHESIZED THIN SHELL PASSIVATED SILICON NANOCRYSTALS WITH A NARROW PHOTOLUMINESCENCE LINEWIDTH

SUMMARY OF THE INVENTION

The present invention relates to a method for preparation of a material comprising silicon nanocrystals with a thin surface passivation shell, wherein the nanocrystals exhibit quite exceptional optical properties, like extremely narrow homogeneous luminescence full width at half maximum at room temperature. The method starts from a hydrogen silsesquioxane that is modified by organic molecules, for example ketone, ether, ester, and then annealed at the temperature of at least 600° C. in a protective inert atmosphere. During annealing process the passivated silicon nanocrystals are formed. The present invention relates also to the material comprising silicon nanocrystals with a thin surface passivation shell preparable by the method of the invention mentioned above. The invention is particularly useful for preparation of light emitting fluorophores with a narrow emission band.

BACKGROUND OF THE INVENTION

The present invention relates to preparation of silicon nanocrystals from hydrogen silsesquioxane-like molecules with direct surface passivation. Under the term silicon nanocrystal is understood an object with size less than 20 nm in diameter having a regular silicon crystalline lattice. The preparation of silicon nanocrystals from hydrogen silsesquioxane is a well-known procedure (Henderson, J.; Kelly, J. A.; Veinot, J. G. C., Chem. Mater., 2009, 21 (22), 5426-5434.). Silicon nanocrystals are formed within a silicon oxide matrix at high temperatures from non-modified hydrogen silsesquioxane. However, in order to obtain free, surface-passivated silicon nanocrystals several post-fabrication steps are needed. The nanocrystals need to be released from the silicon dioxide matrix, purified and subsequently passivated via a thermal/photochemical/radical-initiated process. This treatment, to our knowledge, leads to a non-uniform coverage of nanocrystals, where passivation molecules tend to polymerize, leaving some surface atoms non-passivated (Yang, Z.; Iqbal, M.; Dobbie, A. R.; Veinot, J. G. C., J. Am. Chem. Soc., 2013, 135 (46), 17595-17601). Under the term silicon nanocrystal passivation shell is understood a layer of molecules, mainly other than silicon, which are bound to surface silicon atoms of the silicon nanocrystal. These procedures are tedious, time and effort consuming and the yield of uniformly passivated silicon nanocrystals is compromised. In general, along with the size of nanocrystals, surface passivation is recognized as an important parameter affecting optical properties. Up to now the passivation with organics molecules resulted in broadening of the linewidth (Sychugov, I.; Fucikova, A.; Pevere, F.; Yang, Z. Y.; Veinot, J. G. C.; Linnros, J.; ACS Photonics, 2014, 1, 10, 998-1005). $SiO_2$ passivated silicon nanocrystals exhibit luminescence linewidth usually in the range of 120-150 meV and for passivation with organic ligands 150-280 meV. An overview of surface passivation by organics molecules is given in review by Veinot (J. G. C. Veinot "Surface Passivation and Functionalization of Si Nanocrystals" in "Silicon Nanocrystals: Physics and Applications" edited by Prof. Dr. Lorenzo Pavesi of Trento University, and Prof. Dr. Rasit Turan, Wiley-VCH Verlag GmbH & Co 2010, ISBN 978-3-527-32160-5).

BRIEF DESCRIPTION OF THE DRAWINGS

FIG. 3 Transmission electron microscope image of a produced silicon nanocrystal with (111) crystallographic planes of silicon visible and highlighted in a white circle.

FIG. 4 Bright field transmission electron microscope images of silicon nanocrystals prepared from methyl isobutyl ketone modified hydrogen silsesquioxane and released from the organosilicon film: a) Fourier transform of image showing (110) and (111) Si planes of the nanoparticle in b); b) High resolution silicon nanocrystal with thin shell image with lattice fringes visible, c) and d) examples of silicon nanocrystal with thin shell showing a thin shell for nanoparticles within film residue.

FIG. 5 Fourier transform infrared spectroscopy of hydrogen silsesquioxane with acetone a) before annealing and b) after annealing. The presence of acetone is observable in spectral range 1400-1780 $cm^{-1}$ and 2800-3200 $cm^{-1}$.

DETAILED DESCRIPTION OF THE INVENTION

Figure 1:
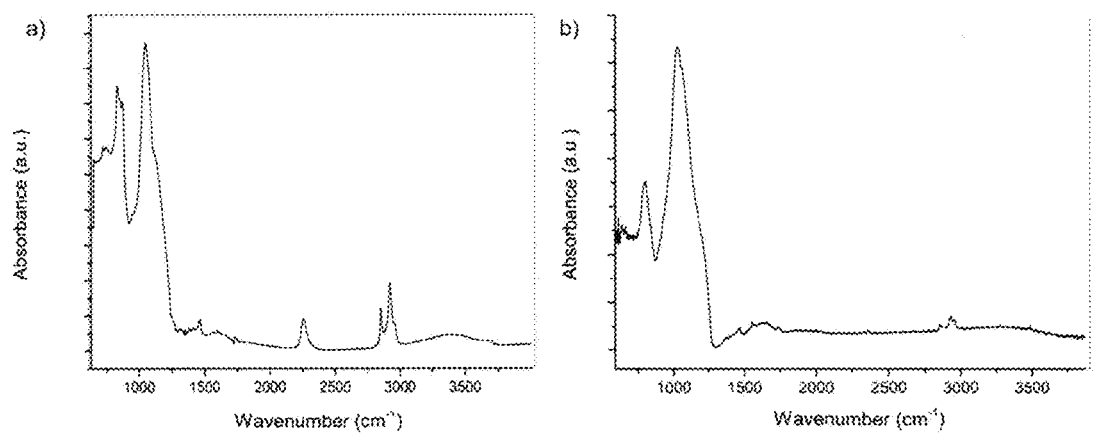
FIG. 1 Fourier transform infrared spectroscopy of hydrogen silsesquioxane with methyl isobutyl ketone a) before annealing and b) after annealing. The presence of methyl isobutyl ketone is observable in spectral range 1400-1780 $cm^{-1}$ and 2800-3200 $cm^{-1}$.

The present inventors have, unexpectedly, found that modification of hydrogen silsesquioxane molecule before annealing step can be used for direct formation of silicon nanocrystals with a uniform thin shell surface passivation layer. Under the term thin shell passivation is understood a surface molecule layer with thickness smaller than silicon nanocrystal diameter. The newly formed silicon nanocrystals with a passivation layer show exceptional optical properties. The formation of passivated silicon nanocrystals take place in annealing process and no further silicon nanocrystal surface modification is needed as in the procedure described in prior art.

The present invention is based on the discovery of a direct synthesis process of silicon nanocrystals embedded in a thin shell from a modified hydrogen silsesquioxane molecules.

The possibility of a simple one-step process was entirely unexpected since the prior-art preparation of passivated silicon nanocrystals consists from several steps. The present inventors have found a procedure how to simplify this process into a one step procedure (i.e. formation of silicone nanocrystal and its passivating thin shell proceed simultaneously during annealing) and obtain silicon nanocrystals with unique optical properties.

The hydrogen silsesquioxane molecules used in this invention were modified by organic molecules (for example alkanes, alkenes, ketones, alcohols, ethers, esters). The organic molecule or its part is bonded to hydrogen silsesquioxane via a heating/photo activation reaction and subsequently excess of non-bounded organic molecules is removed in a drying process in presence of oxygen. Without wishing to be bound by any theory, it has been hypothesized that the presence of oxygen in the drying process promotes additional bonding between organic molecules and hydrogen silsesquioxane.

The organic molecules were selected from a group of hydrocarbon compounds, with straight or branched chain comprising 1 to 30 carbon atoms ($C_1$-$C_{30}$ chain), saturated or unsaturated, or their oxygen derivatives comprising at least one hydroxy (—OH) group and/or at least one carbonyle (—(C=O)—) group in the carbon chain and/or ether (—O—) group. Preferably, the organic molecules are selected from a group consisting of compounds of the formula $R^1$—(C=O)—$R^2$, wherein $R^1$ and $R^2$, independently to each other, is hydrogen and/or ($C_1$-$C_4$)alkyl, ($C_1$-$C_4$)alkenyl or ($C_1$-$C_4$)alkynyl group, or ($C_1$-$C_4$)alkoxy, ($C_1$-$C_4$)alkenyloxy or ($C_1$-$C_4$)alkynyloxy group; and compounds of the formula $R^3$—O—$R^4$, wherein $R^3$ and $R^4$, independently to each other, is hydrogen and/or ($C_1$-$C_4$)alkyl, ($C_1$-$C_4$)alkenyl or ($C_1$-$C_4$)alkynyl group; and ($C_2$-$C_{18}$)alkane, ($C_2$-$C_{18}$)alkene or ($C_2$-$C_{18}$)alkyne, unsubstituted or substituted with at least one —OH group; and mixture there of.

More preferably, the organic molecules are selected from a group consisting of compounds of the formula $R^1$—(C=O)—$R^2$, wherein $R^1$ and $R^2$, independently to each other, is hydrogen and/or ($C_1$-$C_4$)alkyl, ($C_1$-$C_4$)alkenyl or ($C_1$-$C_4$)alkynyl group, or ($C_1$-$C_4$)alkoxy, ($C_1$-$C_4$)alkenyloxy or ($C_1$-$C_4$)alkynyloxy group.

Preferably, the organic molecules are selected from short ketons, ethers or esters.

More preferably, the organic compound is selected from a group consisting of acetone, methyl isobutyl ketone, ethyl acetate, diethyl ether, butyl acrylate, octadecene, acetylacetone, 1-decanol and decane, or a mixture thereof.

Most preferably, the organic molecules are selected from short ketons, like acetone or methyl isobutyl ketone.

The modified hydrogen silsesquioxane molecules are then annealed at temperatures of at least 600° C., preferably from at 600° C. to 1500° C., more preferably from 900° C. to 1100° C. and most preferably about 1000° C. (1000° C.±75° C.) in an inert atmosphere (for example Ar or $N_2$ with up to 20% $H_2$) at times sufficient to convert the modified hydrogen silsesquioxane molecules into silicon nanocrystals with a thin passivation shell composed from silicon and added organic molecules. The sufficient time is for example 1 hour at temperature 1000° C. in the inert atmosphere with 5% $H_2$.

The presence of crystalline core was confirmed by high resolution transmission microscopy and the composition of surface shell was deducted from Fourier transform infrared spectroscopy. In the annealing process Si atoms originating from the hydrogen silsesquioxane are clustering in the centre of the hydrogen silsesquioxane agglomerate and organic molecules, including excess oxygen from hydrogen silsesquioxane, are pushed towards the surface of the newly created silicon nanocrystals. The organic molecules on the surface of a newly created silicon nanocrystal are partially decomposed/carbonized due to an excess of oxygen supplied by the hydrogen silsesquioxane and by the $H_2$ supplied from the annealing atmosphere. Due to a limited number of oxygen atoms the organic molecule is not carbonized/decomposed totally and surface bonds such as Si—O—(C=O)—R, Si—O—C—R, Si—C—R can be formed, where R stands for the non-carbonized part of the organic molecule. The carbonization/decomposition reaction is self-limited due to a limited supply of oxygen, which originates solely from the modified hydrogen silsesquioxane molecules. The excess molecules which do not form silicon nanocrystals or the organosilicon shell are forming porous organosilicon by-products.

The silicon nanocrystals with passivation shell can be freed easily from the porous organosilicon by-products. The organosilicon by-products are decomposed by treatment in solvents and disrupted by exposure to hydrofluoric acid. Silicon nanocrystals with passivation shell are separated from the by-product chemical residue and can be kept for future use in powder or colloidal form.

These silicon nanocrystals with passivation shell prepared by the process described above exhibited exceptional optical properties compared to other silicon nanocrystals: The main difference is in the linewidth of individual silicon nanocrystals (21 meV at room temperature corresponding to 8 nm in case of silicon nanocrystals modified by methyl isobutyl ketone and 17 meV corresponding to 5 nm in case of silicon nanocrystals modified by acetone). This narrow linewidth outperforms even some direct-bandgap quantum dots which are currently used and which are based on elements harmful to the environment, such as cadmium.

The present invention relates to the method for preparation of a material comprising silicon nanocrystals with a thin passivation shell comprising following steps
a) mixing hydrogen silsesquioxane matrix with organic compound;
b) modification of the hydrogen silsesquioxane by bonding of at least part of molecules of organic compound to the hydrogen silsesquioxane by mixing at 60° C. for several hours;
c) drying of the modified hydrogen silsesquioxane in the atmosphere containing oxygen; and
d) annealing of the dry modified hydrogen silsesquioxane by heating to temperature of at least 600° C. in a protective inert atmosphere with up to 20% $H_2$ for a time sufficient to convert the hydrogen silsesquioxane into silicon nanocrystals with surface passivation layer;
wherein the organic compound is selected from a group consisting of hydrocarbons, with straight or branched chain comprising 1-30 carbon atoms, saturated or unsaturated, or their oxygen derivatives comprising at least one hydroxy group and/or at least one carbonyl group in the carbon chain and/or ether group.

The present invention further relates to the material comprising silicon nanocrystals with a thin surface passivation shell preparable by the method according to the invention.

Various preferred embodiments of the method of the invention are demonstrated in the description or in the examples. Also any combination of preferred embodiments will fall within a scope of the present invention. The specification explains the main features of the present invention; however, it does not imply that the invention must include all features and aspect described herein. The scope of the protection will be defined by the patent claims attached to this description. The skilled person will get full understanding of the present invention from the description together with the following examples, wherein some specific features and aspects will be explained in more details.

EXAMPLES OF THE SPECIFIC EMBODIMENTS

General Methodical Remarks

Modification of the hydrogen silsesquioxane molecule was done in air in laboratory glassware. Hydrogen silsesquioxane was produced in our laboratory by the method described in U.S. Pat. No. 3,615,272 and also obtained from Dow Corning (Catalogue No. DOW CORNING®XR-1541-002 E-BEAM RESIST IN MIBK). The organic compounds used for modification (methyl isobutyl ketone, acetone et cetera) were standard reagents from Sigma Aldrich.

The annealing was performed in a protective atmosphere of Ar with up to 20% $H_2$. For annealing furnace, STF 15/180 from Carbolite was used. For measuring the luminescence linewidth of individual silicon nanocrystals a micro-photoluminescence setup was used. It consists of an optical inverted microscope system (Zeiss Axio observer.Z1m) connected to a spectrograph (Andor Shamrock 500i) and an EMCCD camera (Andor, iXon3). The microscope is equipped with a micro manipulator ITGCA2 for precise positioning of the sample. The sample is excited by a continuous wave laser at an emission wavelength of 405 nm. The laser beam is directed onto the sample in a dark-field geometry and the emission signal is collected by the objective lens and led trough a set of filters through the spectrograph to the camera. For room temperature measurements the objective Nikon EC Epiplan Neofluar 100×/0.70 NA was used. The measurement is controlled trough the Andor Solis 4.22 software.

The transmission electron images of samples have been measured with JEM-2100F Transmission Electron Microscope from company JOEL. The Fourier transform infrared spectra have been measured with Nicolet FT-IR spectrometer from Thermo Scientific equipped with a DTGS KBr detector and built-in germanium crystal ATR.

Example 1

Preparation of Silicon Nanocrystals with a Thin Surface Passivation Layer by Using Methyl Isobutyl Ketone A crystallised form of the non-annealed hydrogen silsesquioxane molecule was added to methyl isobutyl ketone and stirred at about 60° C. on a magnetic stirrer for several hours. The methyl isobutyl ketone molecule bonded to the hydrogen silsesquioxane molecule in the drying/photo-activation/heat treatment prior to the final annealing. The presence of bonded methyl isobutyl ketone in hydrogen silsesquioxane was proven by Fourier transform infrared spectroscopy before annealing, and residue of methyl isobutyl ketone was observed after the annealing step as seen in FIG. 1. A droplet of the modified hydrogen silsesquioxane molecules with the solvent was placed on a silicon wafer carrier and dried out in air in order to remove the excess of solvent molecules and promote additional bonding between hydrogen silsesquioxane and methyl isobutyl ketone.

The modified hydrogen silsesquioxane molecules on the carrier was transferred to a furnace and annealed in a 5% $H_2$ and 95% Ar atmosphere. The sample was heated at 17° C./min until the desired 1000° C. temperature was reached, then it was annealed at this temperature for 1 hour. After annealing, the modified hydrogen silsesquioxane formed silicon nanocrystals with a thin passivating methyl isobutyl ketone residue shell containing clearly identified (as derived from Fourier transform infrared spectroscopy, bonds present on silicon nanocrystals are Si—O—(C=O)—R, where R stands for the non-carbonized part of the organic molecule) surrounded by porous organosilicon by-products.

Figure 2:
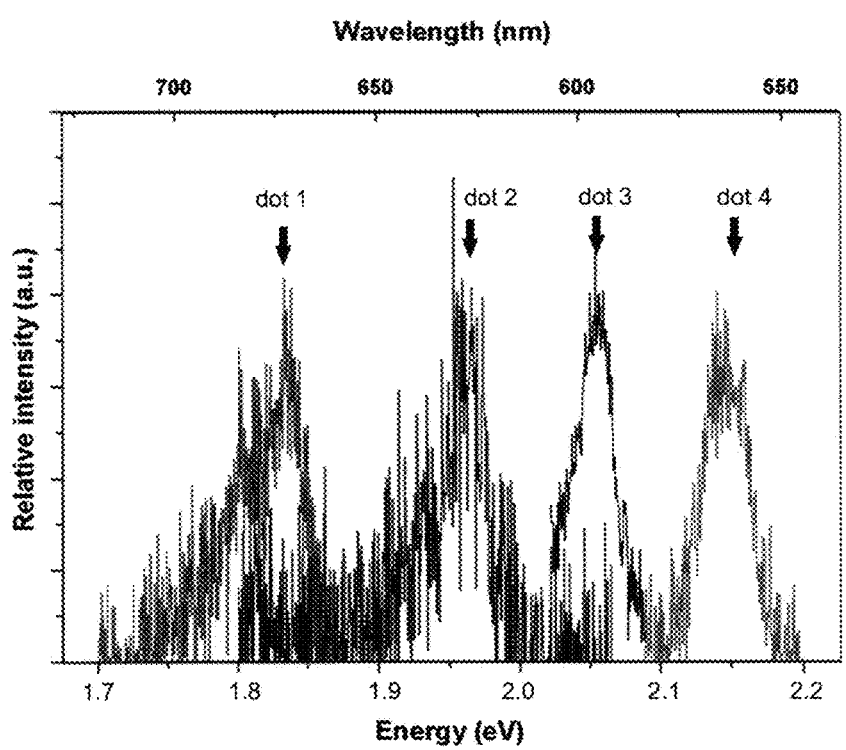
FIG. 2 Examples of room temperature luminescence spectrum from single nanocrystals prepared with methyl isobutyl ketone.

These silicon nanocrystals exhibited quite exceptional optical properties compared to the known silicon nanocrystals where the main difference is in the linewidth of individual silicon nanocrystals (21 meV at room temperature), which is the lowest linewidth measured up to date. The linewidth outperforms even some direct-bandgap quantum dots, which are currently in use and composed from elements harmful to the environment. For examples of room temperature luminescence spectra of individual nanocrystals prepared by this procedure see FIG. 2, where the individual peaks are assigned to single emitting source-silicon nanocrystals (dot1-dot4). The so formed Si nanocrystals keep their photoluminescence abilities under extremely high excitations and remained stable up to at least 28 months. A high resolution electron microscope image of such a nanocrystal is shown in FIG. 3. For comparison of more results see Table I below.

Further, the structure of material prepared in this example is demonstrated on FIG. 4. FIG. 4a, which is a forward Fourier transform of the area with a nanoparticle in FIG. 4b, clearly shows peaks corresponding to Si (110) and (111) crystallographic planes, confirming the presence of silicon nanocrystals in the produced film. For nanoparticles, which were completely released from the film, a thin shell (1-2 nm) around them was observed (FIGS. 4c and 4d)). The contrast here presumably comes from the presence of Si atoms presented in disrupted organosilicon film around nanoparticles and the lack of it in the thin passivating layer, mainly consisting of O, C and H elements as discussed above.

Example 2

Preparation of Silicon Nanocrystals with a Thin Surface Passivation Layer by Using Acetone A crystallised form of the non-annealed hydrogen silsesquioxane molecule was added to acetone and stirred at about 60° C. on a magnetic stirrer for several hours. The acetone bonded to hydrogen silsesquioxane molecule and got into the cage structure of the hydrogen silsesquioxane in the drying/photo-activation/heat treatment prior final annealing. A droplet of the modified hydrogen silsesquioxane molecules with the solvent was placed on a silicon wafer carrier and dried out on air in order to remove excess of solvent molecules and promote additional bonding between hydrogen silsesquioxane and acetone.

The modified hydrogen silsesquioxane molecules on the carrier was transferred to a furnace and annealed in a 5% $H_2$ and 95% Ar atmosphere. The sample was heated at 17° C./min until the desired 1000° C. temperature was reached, then it was annealed at this temperature for 1 hour. After annealing, the modified hydrogen silsesquioxane formed silicon nanocrystals with a passivation organic shell (presumable bonds present on silicon nanocrystals are Si—R where R stands for modified acetone molecule) in porous organosilicon by-products.

The presence of bonded acetone in hydrogen silsesquioxane was proven by Fourier transform infrared spectroscopy before annealing, and residue of acetone was observed after the annealing step as seen in FIG. 5.

The nanocrystals showed even more narrow emission spectra (17 meV) as described in example 1. The amount of narrow emitting nanocrystals is lower than in example 1. For comparison of more results see Table I below.

Examples 3-9

Preparation of Silicon Nanocrystals with a Thin Surface Passivation Layer by Using Other Organic Compounds Various organic molecules have been tested in the procedure identical to example 1 with results summarized in Table I.

TABLE I

Linewidth and peak position of the emission measured at room temperature for the surface passivated nanocrystals prepared with a range of organic compounds

| Example No. | Chemical compound | Linewidth (meV) | Peak position (eV/nm) |
|---|---|---|---|
| 1 | Methyl isobutyl ketone | 21 | 1.97/629 |
| 2 | Acetone | 17 | 1.93/642 |
| 3 | Ethyl acetate | 30-60 | 2.00/619 |
| 4 | Diethyl ether | 20-50 | 1.95/635 |
| 5 | Butyl acrylate | 20-60 | 1.95/635 |
| 6 | Octadecene | 20-60 | 2.07/598 |
| 7 | Acetylacetone | 20-40 | 1.90/650 |
| 8 | 1-Decanol | 20-60 | 1.85/624 |
| 9 | Decane | 20-80 | 2.00/620 |

In example 1, the method resulted in the effective production of nanocrystals, wherein all nanocrystals have homogenous linewidth. In example 2, the resulting nanocrystals have even narrowest linewidth then in example 1, but production was less effective (lower amount of crystals was produced).

The organic molecules used in examples 3 to 9 produced also narrower emitting nanocrystals compared to $SiO_2$ passivated nanocrystals (120-150 meV), and even narrower then for ligand passivated nanocrystals e.g. dodecene (150-280 meV) known from prior art. Exceptionally narrow linewidth were obtained for nanocrystals passivated with acetone (17 meV) or methyl isobutyl ketone (21 meV). Molecules in examples 3-9 produced substantially lower amount of passivated nanocrystals compared to when methyl isobutyl ketone was used. The nanocrystals of examples 5 to 9 are showing various linewidth distribution suggesting inhomogeneous passivation unlike to example 1 and 2.

The values in Table I represent an average values from 3 to 20 repeats, wherein each repeat produced tens to hundreds of measured nanocrystals. In examples 1-2 individual analysis of 600-1000 nanocrystals was performed, in examples 3-9 at least 300 nanocrystals were analysed. In some cases, the best nanocrystals prepared with methyl isobutyl ketone or acetone exhibit narrow homogeneous luminescence full width at half maximum at room temperature lower than 16 meV (5 nm) and even as low as 12 meV (4 nm), respectively.

What is claimed is:

1. A method for preparation of a material comprising silicon nanocrystals with a thin surface passivation shell comprising following steps
    a) mixing hydrogen silsesquioxane matrix with organic compound;
    b) modification of the hydrogen silsesquioxane by bonding of at least part of molecules of organic compound to the hydrogen silsesquioxane by mixing at 60° C. for several hours;
    c) drying of the modified hydrogen silsesquioxane in the atmosphere containing oxygen; and
    d) annealing of the dry modified hydrogen silsesquioxane by heating to temperature of at least 600° C. in a protective inert atmosphere with up to 20% $H_2$ for a time sufficient to convert the hydrogen silsesquioxane into silicon nanocrystals with surface passivation layer;
    wherein the organic compound is selected from a group consisting of hydrocarbons, with straight or branched chain comprising 1-30 carbon atoms, saturated or unsaturated, or their oxygen derivatives comprising at least one hydroxy group and/or at least one carbonyl group in the carbon chain and/or ether group.

2. The method according to claim 1, wherein the organic compound is selected from a group consisting of compounds of the formula $R^1$—(C=O)—$R^2$, wherein $R^1$ and $R^2$ independently to each other, is hydrogen and/or $(C_1$-$C_4)$alkyl, $(C_1$-$C_4)$alkenyl or $(C_1$-$C_4)$alkynyl group, or $(C_1$-$C_4)$alkoxy, $(C_1$-$C_4)$alkenyloxy or $(C_1$-$C_4)$alkynyloxy group; and compounds of the formula $R^3$—O—$R^1$, wherein $R^3$ and $R^4$, independently to each other, is hydrogen and/or $(C_1$-$C_4)$ alkyl, $(C_1$-$C_4)$alkenyl or $(C_1$-$C_4)$alkynyl group; and $(C_2$-$C_{18})$ alkane, $(C_2$-$C_{18})$alkene or $(C_2$-$C_{18})$alkyne, unsubstituted or substituted with at least one —OH group; and mixture thereof.

3. The method according to claim 2, wherein the organic molecule is selected from a group consisting of acetone, methyl isobutyl ketone, ethyl acetate, diethyl ether, butyl acrylate, octadecene, acetylacetone, 1-decanol and decane, or a mixture thereof.

4. The method according to claim 3, wherein the organic molecule is selected from a group consisting of acetone or methyl isobutyl ketone or a mixture thereof.

5. The method according to claim 1, wherein the annealing is performed at the temperature at about 1000° C.

6. The method according to claim 1, wherein the annealing is performed in the Ar atmosphere comprising about 5% of $H_2$.

7. The method according to claim 1, wherein the annealing is performed for at 1 hour.

8. The method according to claim 1, wherein the method further comprises a step of separating silicon nanocrystals with passivation shell from the product obtained in step d) by treating it with solvent and exposing to hydrofluoric acid.

9. A material comprising silicon nanocrystals with a thin surface passivation shell prepared by the method according to any one of claims 1-4 and 5-7.

10. The material according to claim 8, wherein silicon nanocrystals have a core and a thin passivation shell, wherein the core of the nanocrystals comprises silicon atoms arranged in a regular silicon lattice and the shell comprises surface silicon atoms chemically bound to organic molecules or their residues.

11. The material according to claim 9, wherein the silicon nanocrystal surface bond is Si—O—(C=O)—R, Si—O—C—R or Si—R, where R stands for non-carbonized residue of the organic molecule used for modification of hydrogen silsesquioxane.

12. The material according to claim 9, wherein the silicon nanocrystal surface bond is Si—O—(C=O)—R, where R stands for non-carbonized residue of the organic molecule used for modification of hydrogen silsesquioxane.

13. The material according to claim 8, wherein the nanocrystals with a thin organic shell exhibit narrow homogeneous luminescence full width at half maximum at room temperature 80-12 meV.

14. The material accordingly to claim 8, wherein the organic compound is methyl isobutyl ketone and the nanocrystals with a thin organic shell exhibit narrow homogenous luminescence full width at half maximum at room temperature of 16 mV.

15. The material accordingly to claim 8, wherein the organic compound is acetone and the nanocrystals with a thin organic shell exhibit narrow homogenous luminescence full width at half maximum at room temperature of 12 mV.

\* \* \* \* \*